United States Patent [19]
Bauer et al.

[11] Patent Number: 5,986,975
[45] Date of Patent: Nov. 16, 1999

[54] DRAG ANTENNA

[75] Inventors: Wilhelm Bauer, Osterholz-Scharmbeck; Axel Brenner, Bremen; Horst Hoestermann, Bremen; Joachim Licht, Bremen; Helmut Schmidt-Schierhorn, Bremen, all of Germany

[73] Assignee: STN ATLAS Elektronik GmbH, Germany

[21] Appl. No.: 09/081,779

[22] Filed: May 20, 1998

[30] Foreign Application Priority Data

May 20, 1997 [DE] Germany ............... 197 20 991

[51] Int. Cl.⁶ .................... G01S 7/521; G01S 15/06
[52] U.S. Cl. .............................. 367/106; 367/130
[58] Field of Search .................. 367/20, 106, 130, 367/154, 177; 174/101.5; 343/709; 114/242, 253

[56] References Cited

U.S. PATENT DOCUMENTS 3,414,874 12/1968 McLoad .
4,468,760 8/1984 Zalesak et al. .
5,835,450 11/1998 Russell ........................... 367/20

FOREIGN PATENT DOCUMENTS 37 39 184 C2 6/1989 Germany .

OTHER PUBLICATIONS

Joris Janssen Lok, "17–Ton ALF Heads Dutch Sonar Tests", Mar. 26, 1994, Janes's Defense Weekly, pp. 26 and 31.

*Primary Examiner*—Ian J. Lobo
*Attorney, Agent, or Firm*—Venable; George H. Spencer; Robert Kinberg

[57] ABSTRACT

A drag antenna for a sonar system for detecting and/or locating sources of sound in water includes at least two acoustically sensitive lines positioned side-by-side and laterally spaced apart during a trailing operation. The lines are secured to each other at the leading ends and at the trailing ends by respective connecting element in order to lower the production costs for the drag antenna and to achieve a sufficiently constant lateral spacing between the acoustically sensitive lines.

16 Claims, 1 Drawing Sheet

DRAG ANTENNA

CROSS-REFERENCE TO RELATED APPLICATIONS

Priority is claimed with respect to German application No. 197 20 991.2 filed in Germany on May 20, 1997, the disclosure of which is incorporated herein by reference.

BACKGROUND OF THE INVENTION

The invention relates to a drag antenna for a sonar system for detecting and/or locating sources of sound in water, and more particularly to a drag antenna of this type that includes at least two side-by-side, laterally spaced-apart, acoustically sensitive lines holding a plurality of electro-acoustical converters (hydrophones) arranged one after another in a direction of the lines wherein the lines are connected at their leading ends with a connecting element that establishes a fixed lateral spacing between the leading ends of the lines.

With a sonar system installed in a towing craft for detecting and locating targets, such drag antennas are used for a more precise determination of the angle of incidence for sound waves radiated by targets in the water or reflected by targets in the water. The at least two parallel-extending, sensitive hydrophone lines or streamers in this case permit a so-called right/left discrimination, meaning a statement as to whether the direction of the sound incidence is on the starboard side or the port side of the drag antenna.

With a drag antenna of this type, known as a twin array (see Joris Jannsen Lok, "17-Ton ALF Heads Dutch Sonar Tests," *Jane's Defense Weekly,* Mar. 26, 1994, pages 26 to 31), two individual hydrophone streamers are launched separately from the towing craft and are attached at a lateral distance to each other at their leading ends to a towing gear, also called an otter, via a respective pull cable. The towing gear, which in this case accommodates the transmitting section of the so-called active sonar system, is dragged by a towing craft through the water, with the aid of another pull cable. Owing to drag bodies that are attached to the trailing end of the two hydrophone streamers and which have an increased flow resistance, thereby generating a pulling force at the trailing end that is effective in a counter drag direction, the two hydrophone streamers are kept as much as possible in a stretched-out position. Since each hydrophone streamer aligns itself freely in the flow direction behind the front pull cable, a parallel alignment of the two hydrophone streamers, which is advantageous for the right/left discrimination, meaning a constant lateral spacing between the two hydrophone streamers that is sufficient for the line length, is not ensured. Additional and involved methods consequently must be used to detect the exact position of the hydrophones at the moment of sound incidence, so that the exact direction of the sound incidence can be determined.

U.S. Pat. No. 3,414,874 discloses a drag antenna for seismic underwater prospecting in which the leading ends of the drag antenna are connected via a cable (see FIG. 3 thereof). Two otters or drag bodies, arranged at the leading ends of the two outer lines ensure that a lateral force component acts upon the connecting cable during the dragging operation, which lateral force component keeps the connecting cable between the line beginnings stretched tight.

SUMMARY OF THE INVENTION

It is an object of the invention to provide a more advantageous design for a drag antenna of the aforementioned type with respect to production costs and, as a basis for this, ensure a nearly constant lateral spacing between the acoustically sensitive lines during the dragging of the drag antenna.

The above and other objects are accomplished according to the invention by the provision of a drag antenna for a sonar system for detecting and/or locating sources of sound in water, comprising: at least two acoustically sensitive lines arranged side-by-side and laterally spaced-apart for holding a plurality of electro-acoustical converters arranged one after another in a direction of the lines, the lines each having leading and trailing ends; a first connecting element connected to the leading ends of the lines for establishing a first fixed lateral spacing between the lines at the leading ends; and a second connecting element connected to the trailing ends of the lines for establishing a second fixed lateral spacing between the lines at the trailing ends which is the same as the first fixed lateral spacing.

The advantage of the drag antenna according to the invention is that owing to the rigid securing of the leading and trailing ends of the acoustically sensitive lines or streamers with respect to the lateral spacing, the parallelism adjusting between the individual lines when the antenna is dragged is excellent and the lateral spacing over the length of the lines is sufficiently constant. The connecting elements furthermore make it possible to provide a joint pull cable and a joint drag brake for all lines, as well as joint damping modules assigned to the pull cable on the one hand and the drag brake on the other hand, so that a plurality of components can be saved as compared to the known drag antenna. This not only drastically reduces the production costs for the drag antenna, but also reduces its total weight. The drag antenna can therefore be launched and pulled back easier and the handling system for the antenna can have a less sturdy design and thus also weigh less. By omitting multiple components such as pull cable, drag brake, and damping modules, the production costs can be significantly lowered as compared to traditional drag antennas. The excellent constancy of the lateral spacing between the acoustically sensitive lines of the drag antenna drastically reduces the additional expenditure for signal processing to discriminate between left/right.

In accordance with a preferred embodiment of the invention, the connecting elements are in the form of connecting forks. Further, a stabilizer with a flow-favorable external profile is arranged on each of the connecting forks that connect the leading and trailing ends of the two lines of the drag antenna (a so-called twin array comprising two acoustically sensitive lines). Additional flow bodies are provided on the stabilizer that is assigned to the leading ends of the lines, which flow bodies are oriented axis-parallel to the fork axis on the top and bottom side of the stabilizer, respectively, at a distance to the stabilizer surface. The stabilizers make it possible to compensate for excess weight in the fork region as well as twisting moments caused by the pull cable. In addition, the rear stabilizer prevents a twisting of the drag antenna, resulting in a crossing of the lines, when the drag antenna is launched from the towing craft. The stabilizer form is hydrodynamically optimized.

In accordance with one advantageous embodiment of the invention, each stabilizer is divided along an axial center plane into an upper and a lower stabilizer half, which can be fitted onto the connecting fork from opposite sides and can then be joined, preferably by locking them together. Owing to this design, the two stabilizers can be assembled quickly when the drag antenna is launched and can also be dismantled quickly when the drag antenna is pulled in, so that the stabilizers do not present an obstruction when the drag antenna is wound in the standard way around a drum winch.

According to one advantageous embodiment of the invention, a damping module (VIM) is arranged between the leading and trailing ends of each line on the one hand and the leading and trailing connecting elements, respectively, on the other hand. The front (leading) damping modules makes it possible to achieve a good acoustic balancing out of the acoustically sensitive lines relative to the impact and vibration noises of the pull cable, as well as the flow noises caused by the trailing body or otter that may be placed in front of the pull cable and by the stabilizer supported on the leading connecting fork. The rear (trailing) damping modules make it possible to achieve an acoustic balancing out relative to the impact and vibration noises from the drag brake and the flow noises from the stabilizer attached to the rear connecting fork. In particular in the low-frequency ranges, this leads to a considerable gain in the useful signal received by the twin array, whereas in the high-frequency range, the arrangement of a single damping module in front of the leading connecting element and a single damping module behind the trailing connecting element is sufficient for acoustical purposes, so that the production costs for the drag antenna can be reduced here, owing to the lower number of damping modules.

BRIEF DESCRIPTION OF THE DRAWINGS

The invention is described in more detail in the following with the aid of an illustrated exemplary embodiment shown in the sole drawing of FIG. 1 which shows details of an enlarged, perspective view of a drag antenna for a sonar system according to the invention.

DETAILED DESCRIPTION OF THE INVENTION

Figure 1:
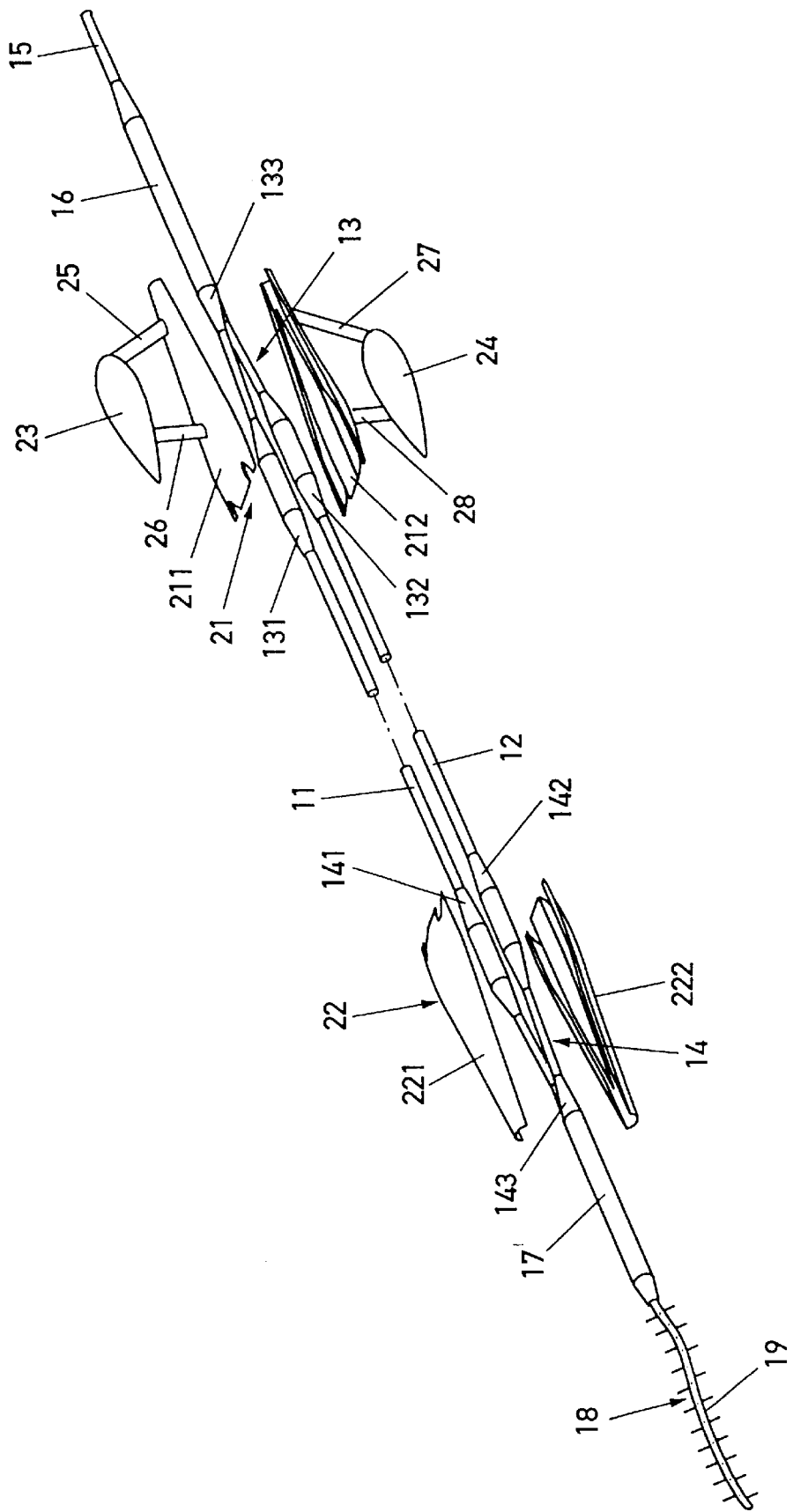

Referring to FIG. 1, there is shown a perspective view of a drag antenna for a sonar system for detecting and/or locating sources of sound in water according to the invention which includes two acoustically sensitive streamers or lines 11, 12 that respectively hold a plurality of electro-acoustical converters, so-called hydrophones, which are not shown in detail here and are arranged one after another in the direction of the lines. The individual hydrophones are secured in a known way and with uniform spacing along the streamer and are connected via electrical signal lines and current supply lines with the sonar system that is installed in a towing craft, also not shown. In an operating state, the drag antenna, also called a twin array because of its two acoustically sensitive streamers or lines 11, 12, is dragged through the water behind the towing craft. When not in operation, it is reeled in by the towing craft with the aid of a winch drum, positioned on deck of the towing craft.

The leading ends and trailing ends of the two lines 11, 12 are secured to each other, respectively, with respective connecting elements 13, 14 for maintaining a constant lateral spacing which must be the same at the leading and trailing ends of the lines. In the exemplary embodiment described here, the connecting elements respectively, are configured as Y-shaped connecting forks 13, 14. The leading (front) connecting fork 13 connects the two leading ends of lines 11, 12 and the (trailing) rear connecting fork 14 connects the trailing ends of the two lines 11, 12. Each connecting fork 13, 14 has three connecting ends 131, 132, 133 and 141, 142, 143, respectively, positioned on the corner points of an imaginary isosceles triangle. The two connecting ends, positioned on the base corner points 131, 132 and 141, 142, hold the leading ends and the trailing ends of the two lines 11, 12. A pull cable 15 is inserted into the third connecting end 133 of connecting fork 13, which pull cable is connected mechanically and electrically with the two lines 11, 12. In order to dampen the pulling forces acting upon the front connecting fork 13 and to balance out interfering noises for the two acoustically sensitive lines 11, 12, which develop during the dragging of the drag antenna, a so-called damping module 16, also called a VIM, is additionally arranged between pull cable 15 and connecting end 133 of fork 13. The lines 11, 12, are supplied with power and a signal connection to the sonar system is established with the aid of pull cable 15, which is secured on the towing craft (not shown) or to a trailing body (not shown), also referred to as an otter, which is dragged by the towing craft. A drag brake 18 is attached to third connecting end 143 of the rear connecting fork 14 that is assigned to the trailing ends of the two lines 11, 12. Here too, a damping module 17 for acoustically balancing out the two lines 11, 12 is connected between drag brake 18 and third connecting end 143 of connecting fork 14. Drag brake 18 generates a pulling force on the trailing ends of the two lines 11, 12, owing to its increased flow resistance, which keeps the lines for the most part in a stretched-out condition during the dragging operation. A fiber rope 19 is preferably used as drag brake 18 and is composed of several twisted together fiber strands between which fiber cross pieces are pulled through.

Stabilizers 21 and 22 are arranged on the two connecting forks 13, 14, respectively. The two stabilizers 21, 22 are designed such that they compensate for excessive weight in the region of connecting forks 13, 14 as well as twisting moments caused by pull cable 15. The shape of stabilizers 21, 22 is hydrodynamically optimized. Each stabilizer 21 and 22 is designed such that it can be detached from the associated connecting fork 13 or 14. To achieve this, each stabilizer 21, 22 is divided along an axial center plane into an upper and lower stabilizer half 211 and 212 or 221 and 222. The two stabilizer halves 211, 212 or 221, 222 can be fitted onto the connecting fork 13 or 14 from opposite sides and can be joined together, wherein they are preferably locked together along the separation plane. Each stabilizer half 211, 212 or 221, 222 forms a half shell with a flow-favorable external profile, which can be fitted in a form-locking way onto the top and bottom of the associated connecting fork 13 or 14. The stabilizer 21 that is associated with front connecting fork 13 at the leading ends of the two lines 11, 12 additionally has two flow bodies 23, 24, which are arranged above and below the stabilizer 21, at a distance to the stabilizer surface and parallel to the fork axis. Each flow body 23, 24 in this case is attached with two supporting pieces 25, 26 or 27, 28 to the surface of the associated stabilizer half 211 or 212, wherein the supporting pieces 25 to 28 extend in a plane running through the fork axis.

According to a further embodiment of the invention, identical damping modules or VIM, which are not shown in further detail, can be arranged between the ends of lines 11, 12 and the connecting forks 13, 14. That is, one damping module is placed between each leading end of the two lines 11, 12 on the one hand and between the connecting ends 131 and 132, respectively, of the front connecting fork 13. Further, one damping module is placed between each of the trailing ends of the two lines 11, 12 and the connecting ends 141 and 142, respectively, of rear connecting fork 14. This results in considerable acoustical advantages, in particular in the low-frequency range, which improve the receiving quality of the drag antenna.

The invention is not limited to the above-described exemplary embodiment. Thus, the drag antenna can have more than two acoustically sensitive lines that respectively extend parallel to each other at a lateral distance. The connecting elements securing the leading and trailing ends of the plurality of lines in that case have a corresponding multiple number of connecting ends for the individual lines. However, the connecting elements continue to be connected via the two damping modules with the pull cable on the one hand and the drag brake on the other hand.

The invention has been described in detail with respect to preferred embodiments, and it will now be apparent from the foregoing to those skilled in the art, the changes and modifications may be made without departing from the invention in its broader aspects, and the invention, therefore, as defined in the appended claims, is intended to cover all such changes and modifications as to fall within the true spirit of the invention.

What is claimed is:

1. A drag antenna for a sonar system for detecting and/or locating sources of sound in water, comprising:

at least two acoustically sensitive lines arranged side-by-side and laterally spaced-apart for holding a plurality of electro-acoustical converters arranged one after another in a direction of the lines, the lines each having leading and trailing ends;

a first connecting element connected to the leading ends of the lines for establishing a first fixed lateral spacing between the lines at the leading ends; and a second connecting element connected to the trailing ends of the lines for establishing a second fixed lateral spacing between the lines at the trailing ends which is the same as the first fixed lateral spacing.

2. A drag antenna according to claim 1, wherein the at least two acoustically sensitive lines comprise two acoustically sensitive lines and the first and second connecting elements comprise first and second Y-shaped connecting forks, respectively.

3. A drag antenna according to claim 2, wherein each connecting fork includes three connecting ends positioned on corner points, respectively, of an imaginary isosceles triangle having a base and two legs of equal length connected by the base to form first and second base corner points of the isosceles triangle, the third corner point being formed by the connection of the two legs of equal length, the two connecting ends of the first and second connecting forks positioned on the first and second corner points holding the two leading ends and the two trailing ends, respectively, of the two lines.

4. A drag antenna according to claim 3, and further comprising a pull cable including electrical conductors inserted into the third connecting end of the first connecting fork, the pull cable being connected mechanically and electrically with the two lines.

5. A drag antenna according to claim 4, and further comprising a damping module for damping pulling forces acting upon the first connecting fork arranged between the pull cable and the first connecting fork.

6. A drag antenna according to claim 5, and further comprising a drag brake attached to the third connecting end of the second connecting fork.

7. A drag antenna according to claim 6, wherein the drag brake comprises a fiber rope.

8. A drag antenna according to claim 6, and further comprising an additional damping module arranged between the drag brake and the second connecting fork for damping braking forces acting upon the second connecting fork.

9. A drag antenna according to claim 2, and further comprising first and second stabilizers each arranged on a respective one of the first and second connecting forks.

10. A drag antenna according to claim 9, wherein each stabilizer is adapted to be detached from a respective one of the connecting forks.

11. A drag antenna according to claim 10, wherein each stabilizer is divided along a separating plane into an upper and a lower stabilizer half which halves are fitted from opposite sides onto the respective connecting fork and are joined together.

12. The drag antenna according to claim 11, wherein the upper and lower stabilizer halves are locked together.

13. A drag antenna according to claim 11, wherein each stabilizer half comprises a half-shell with a flow-favorable outside profile and is form-locking placed onto a respective one of the upper or lower side of a respective one of the connecting forks.

14. A drag antenna according to claim 9, wherein the first stabilizer arranged on the first connecting fork has a top and a bottom, and the drag antenna further comprises first and second flow bodies attached to the top and bottom, respectively, of the first stabilizer and oriented parallel to a longitudinal axis of the first connecting fork at a distance from the first stabilizer surface.

15. A drag antenna according to claim 14, wherein each flow body comprises two spaced apart supporting pieces extending in a plane through the longitudinal axis of the first connecting fork and being attached to an outside surface of the stabilizer.

16. A drag antenna according to claim 1, and further comprising a plurality of damping modules, wherein between each end of each line and a respective one of the connecting elements there is disposed one of the damping modules.

* * * * *